UNITED STATES PATENT OFFICE.

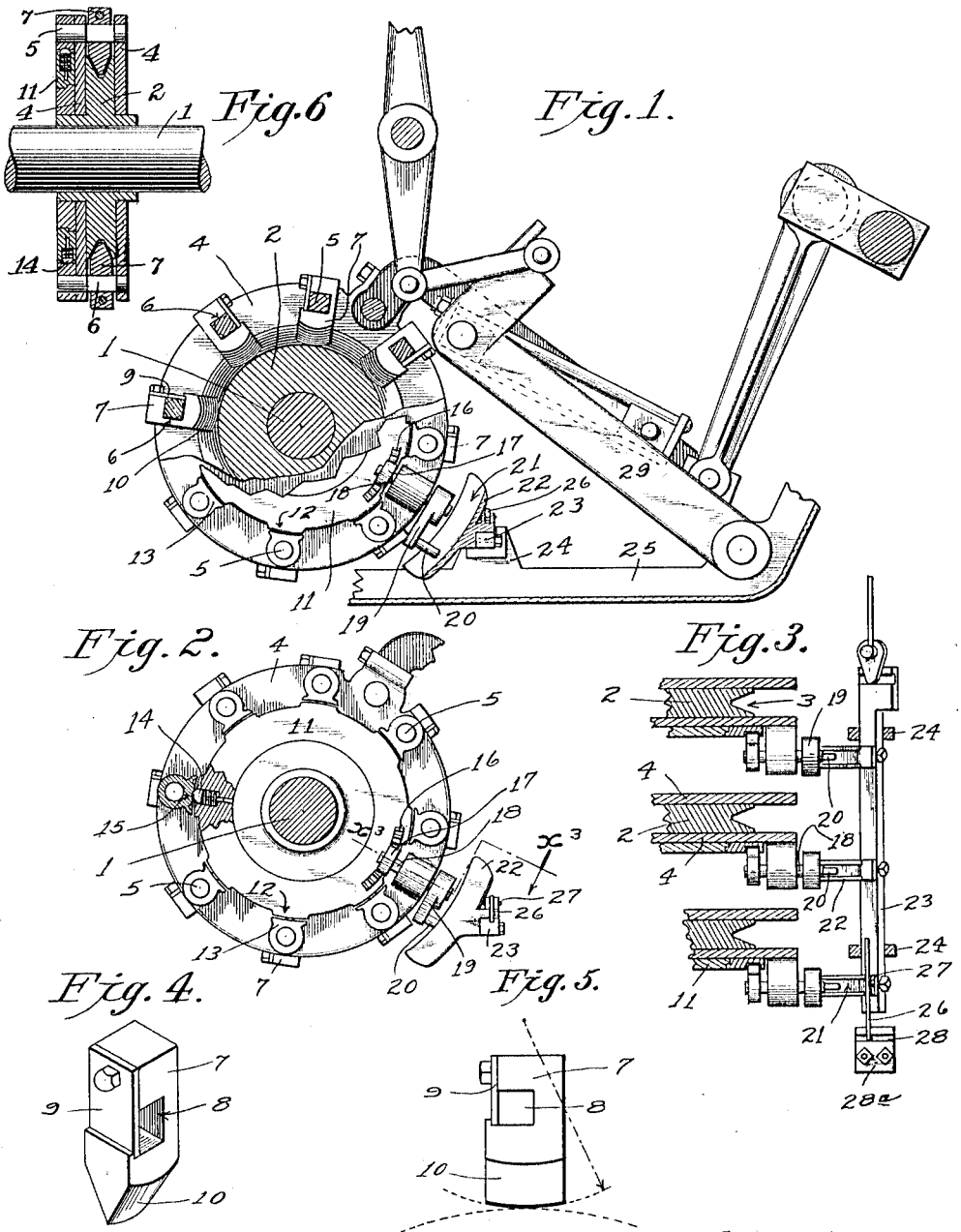

HUGH WILLIAM FELLOWS, OF LOS ANGELES, CALIFORNIA, ASSIGNOR TO FELLOWS DIRECT POWER TRANSMISSION COMPANY, OF LOS ANGELES, CALIFORNIA, A CORPORATION OF ARIZONA TERRITORY.

INTERMITTENT GRIP DEVICE.

1,012,535. Specification of Letters Patent. Patented Dec. 19, 1911.

Original application filed September 8, 1910, Serial No. 581,098. Divided and this application filed February 13, 1911. Serial No. 608,456.

*To all whom it may concern:*

Be it known that I, HUGH WILLIAM FELLOWS, a citizen of the United States, residing at Los Angeles, in the county of Los Angeles and State of California, have invented a new and useful Intermittent Grip Device, of which the following is a specification.

This is a divisional application from a previous application on transmission mechanism, filed September 8, 1910, Serial No. 581,098.

The objects of the present invention are to provide improvements over former mechanisms on intermittent grip devices shown in a previous Patent No. 954,384, April 5, 1910, and in a previous application filed June 23, 1910, Serial No. 568,548; which improvements in the present case consist of a specific construction of the contacting portions of the wedge blocks, whereby a better gripping effect is secured and a quicker release effected, another improvement relating to the device for reversing the operative relation of the wedge blocks, and another improvement relating to a device for locking the reversing device from movement and compelling the unlocking thereof before it can be operated to reverse the wedge blocks, thereby preventing to a considerable extent careless operation of the machine.

Referring to the drawings: Figure 1 is a side view with the intermittent grip device partly in section and showing the oscillating mechanism for operating the intermittent grip device. Fig. 2 is a view similar to Fig. 1 with the oscillating mechanism removed and showing another portion of the intermittent grip device in section. Fig. 3 is a plan view of the reversing device, part of the three associated intermittent grip devices being in section. Fig. 4 is a perspective view in detail of a wedge block. Fig. 5 is a diagrammatical view of a wedge block to illustrate the ratio between the radius of its curve to its axis. Fig. 6 is a section on line $x^6$—$x^6$ Fig. 1.

1 designates the driven shaft upon which is rigidly mounted a disk 2 having a peripheral V-shaped groove 3. Mounted on both sides of each disk 2 are two rockers 4, and journaled between each pair of rockers is a series of short shafts 5, each shaft having a squared portion 6 which receives a wedge block 7, shown in detail in Fig. 4, each wedge block having a square notch 8 which receives the squared portion 6 of the shaft 5, the wedge block being detachably held thereon by a plate 9, as clearly shown in Fig. 4. The inner end of each wedge block is wedge-shaped, as shown, but formed with a convex surface 10, the radius of which is somewhat greater than the total length of the wedge block, with the result that when the wedge blocks stand on a perfect radial line with the driven shaft 1, as in the position shown in Fig. 1, they will not contact with the walls of the V-shaped groove 3, but if their shafts 5 be rocked in either direction to tilt the wedge blocks accordingly, the wedge block will engage with the walls of the groove 3 on that side which is brought into contact with the groove, so that during the stroke of the rocker in one direction, the engagement of the wedge blocks with the grooved disk will turn the disk and during the return stroke of the wedge blocks, they will slide idly in the reverse direction without imparting movement to the grooved disks. Thus the grooved disks may be driven in either direction by tilting the wedge blocks, or the rockers and wedge blocks may be oscillated without imparting any movement whatever to the disks when the wedge blocks are in neutral position, which is the position shown in Figs. 1 and 5.

On one side of a rocker 4 is a shift ring 11 having projections 12 which lie directly under collets 13 on shafts 5. As shown in Fig. 2, a spring-pressed plunger 14 protrudes from each projection 12 and engages a concave depression 15 formed on the inner face of the associated collet. A segmental gear 16 is formed on the side of the shift ring 11 and is engaged by a gear 17 mounted on a short shaft 18 having an arm 19 with a pin 20 which rides in the groove 21 in a segmental shifter 22 which is carried on a shift rod 23 sliding in bearings 24 on the frame 25. Thus, by shifting the shift rod 23, the shifters 22 will be moved laterally of the intermittent grip devices and will thereby, through the medium of pins 20, rock the arms 19 and shafts 18 and, through the medium of gears 17 and 16, rock the shift ring 11 and the rounded heads of the spring-pressed plungers 14, acting in the recesses of the inner ends of collets 13, will rock the latter in the direction according to the direction in which the shift rod 23 is actuated and when the collets are thus turned they will, through the medium of shafts 5, tilt the wedge blocks accordingly. This shifting may take place without interrupting the oscillation of the rockers as the segmental shifters 22 permit the continuous movement of the pins 20.

In order to prevent the intermittent grip devices from being reversed except when their stroke has been reduced to the minimum, a trip in the form of a pivoted latch 26 is employed, as shown in Figs. 1, 2 and 3, which is pivoted at 27 and its end engages in a notch 28 formed in a stationary block 28ª. The latch 26 lies directly under one of the arms of the rock frame 29, so that when the frame 29 is lowered to bring the parts to neutral position, it will strike the latch 26 and release its ends from the notch 28 which will permit the shift rod 23 to be manually actuated to slide it longitudinally in its bearings 24 to reverse the wedge blocks.

What I claim is:

1. In combination, a driven shaft, an intermittent grip device thereon comprising a disk, a rocker, wedge blocks between the rocker and disk, means for reversing the operative relation of the wedge blocks to the disk comprising a shift ring for controlling the angle of the wedge blocks, a crank connected to the shift ring for turning it, a shifter provided with a groove in which the pin of said crank is adapted to move bodily when the intermittent grip device oscillates, and means for moving said shifter laterally to vary the angular position of said crank with respect to the shift ring.

2. In combination, a driven shaft, a plurality of intermittent grip devices thereon, each intermittent grip device comprising a pair of rockers, a disk with a peripheral V-shaped groove between said rockers, a plurality of wedge blocks between the rockers adapted to engage in said groove, shafts extending between the rockers and supporting the wedge blocks, a shift ring adjacent a rocker, a plurality of spring pressed plungers protruding radially from the shift ring, collets on the respective shafts engaging the protruding ends, and means for adjusting the angular position of the shift ring with respect to the rockers.

3. In combination, a driven shaft, a plurality of intermittent grip devices thereon, each intermittent grip device comprising a pair of rockers, a disk with a peripheral V-shaped groove between said rockers, a plurality of wedge blocks between the rockers adapted to engage in said groove, shafts extending between the rockers and supporting the wedge blocks, a shift ring adjacent a rocker, a plurality of spring pressed plungers protruding radially from the shift ring, collets on the respective shafts engaging the protruding ends, a gear on said shift ring, a segmental gear meshing with said gear, a shaft journaled on a rocker and carrying said segmental gear, a crank on said shaft, a pin on said crank, a segmental shifter provided with a groove concentric with the rocker in which said crank pin bodily travels during the oscillation of the rocker, and means for adjusting the shifter laterally to vary the angular position of the crank and thereby adjust the wedge blocks.

4. In combination, a driven shaft, a plurality of intermittent grip devices thereon, each intermittent grip device comprising a pair of rockers, a disk with a peripheral V-shaped groove between said rockers, a plurality of wedge blocks between the rockers adapted to engage in said groove, shafts extending between the rockers and supporting the wedge blocks, a shift ring adjacent a rocker, a plurality of spring pressed plungers protruding radially from the shift ring, collets on the respective shafts engaging the protruding ends, a gear on said shift ring, a segmental gear meshing with said gear, a shaft journaled on a rocker and carrying said segmental gear, a crank on said shaft, a pin on said crank, a segmental shifter provided with a groove concentric with the rocker in which said crank pin bodily travels during the oscillation of the rocker, and a shift rod to which the respective shifters are secured and slidable laterally of the respective intermittent grip devices.

5. In combination, a driven shaft, a plurality of intermittent grip devices thereon, each intermittent grip device comprising a pair of rockers, a disk with a peripheral V-shaped groove between said rockers, a plurality of wedge blocks between the rockers adapted to engage in said groove, shafts extending between the rockers and supporting the wedge blocks, a shift ring adjacent a rocker, a plurality of spring pressed plungers protruding radially from the shift ring, collets on the respective shafts engaging the protruding ends, a gear on said shift ring, a segmental gear meshing with said gear, a shaft journaled on a rocker and carrying said segmental gear, a crank on said shaft, a pin on said crank, a segmental shifter provided with a groove concentric with the rocker in which said crank pin bodily travels during the oscillation of the rocker, and a shift rod to which the respective shifters are secured and slidable laterally of the respective intermittent grip devices, said shift rod having a notch, a pivoted latch engaging said notch, mechanism for oscillating said intermittent grip device, a rock frame for adjusting said oscillating mechanism, said latch being in the path of movement of said rock frame for preventing the reversal of the wedge blocks except when the rock frame has been moved to adjust the oscillating mechanism to impart the minimum movement to the intermittent grip devices.

6. A disk, a rocker oscillating with respect to the disk, wedge blocks pivoted to the rocker, each wedge block having a curved convex face, the radius of which is longer than the swinging radius of the wedge block, the centers of both radii being on the same line intersecting the axis of the disk, the center portion of the curved face of the block clearing the disk when the block is in mid position, the portions of the curved face of the block on both sides of the center constituting two distinct bearing points of the block.

In testimony whereof, I have hereunto set my hand at Los Angeles, California, this 16th day of December, 1910.

HUGH WILLIAM FELLOWS.

In presence of—
GEORGE T. HACKLEY,
FRANK L. A. GRAHAM.

---

Copies of this patent may be obtained for five cents each, by addressing the "Commissioner of Patents, Washington, D. C."